United States Patent
Averdung et al.

(10) Patent No.: US 7,105,228 B2
(45) Date of Patent: Sep. 12, 2006

(54) METHOD FOR MAKING SHAPED STRUCTURES WITH INTERNALLY COATED CAVITIES

(75) Inventors: Johannes Averdung, Gelsenkirchen (DE); Andreas Greiner, Amoeneburg (DE); Joachim H. Wendorff, Marburg (DE); Haoquing Hou, Marburg (DE); Michael Bognitzki, Marburg (DE); Jun Zeng, Marburg (DE)

(73) Assignee: TransMIT Gesellschaft fuer Technologietransfer mbH, Giessen (DE)

( * ) Notice: Subject to any disclaimer, the term of this patent is extended or adjusted under 35 U.S.C. 154(b) by 375 days.

(21) Appl. No.: 10/113,292

(22) Filed: Apr. 2, 2002

(65) Prior Publication Data
US 2003/0098518 A1    May 29, 2003

(30) Foreign Application Priority Data
Apr. 2, 2001  (DE) ............................. 101 16 232

(51) Int. Cl.
*B05B 5/00* (2006.01)
*B82B 3/00* (2006.01)
*D01D 5/24* (2006.01)

(52) U.S. Cl. .................. 428/398; 428/34.4; 428/220; 428/364; 428/376; 428/397; 264/10; 264/43.1; 264/45.1

(58) Field of Classification Search ............... 428/398, 428/364, 397, 376, 34.4, 35.5, 220, 34.6; 264/10
See application file for complete search history.

(56) References Cited

U.S. PATENT DOCUMENTS

| | | | |
|---|---|---|---|
| 3,993,957 A * | 11/1976 | Davenport | ................... 377/47 |
| 4,173,606 A * | 11/1979 | Stoy et al. | ................... 264/2.6 |
| 4,289,810 A * | 9/1981 | Eng et al. | ................... 427/230 |
| 4,557,955 A * | 12/1985 | Walch et al. | ............... 428/35.5 |
| 5,024,789 A | 6/1991 | Berry | ............................ 264/6 |
| 5,298,298 A * | 3/1994 | Hoffman | .................... 428/34.4 |
| 6,667,099 B1 * | 12/2003 | Greiner et al. | .............. 428/398 |

FOREIGN PATENT DOCUMENTS

| | | | |
|---|---|---|---|
| DE | 100 23 456 | | 2/2001 |
| DE | 101 16 232 | | 10/2002 |
| EP | 0 005 035 | | 10/1979 |
| EP | WO01/09414 | * | 2/2001 |
| WO | WO 91/01695 | | 2/1991 |

OTHER PUBLICATIONS

U.S. Appl. No. 10/193,918, filed Jul. 15, 2002, Greiner et al.
U.S. Appl. No. 10/113,292, filed Apr. 2, 2002, Averdung.
U.S. Appl. No. 10/399,783, filed Apr. 28, 2003, Hou et al.
U.S. Appl. No. 10/113,292, filed Apr. 2, 2002, Averdung et al.
Kirk Othmer, "Hollow-Fiber Membranes", Encyclopedia of Chemical Technology, 4th Edition, vol. 13, pp. 312-337.
J. C. W. Chien, et al., "Superconducting Hollow and Solid Fibers and Thin Films of $YBa_2Cu_3O_x$ from a Polymeric precursor", Advanced Materials, vol. 2, No. 6-7, 1990, pp. 305, 308 and 309.
Leonid A. Chernozatonskii, "Polymerized Nanotube Structures-New Zeolites", Chemical Physics Letters, vol. 297, 1998, pp. 257-260.

(Continued)

Primary Examiner—Rena Dye
Assistant Examiner—Camie S. Thompson
(74) Attorney, Agent, or Firm—Oblon, Spivak, McClelland, Maier & Neustadt, P.C.

(57) ABSTRACT

The present invention relates to a method for making shaped structures with internally coated cavities with an inside diameter in the nanometer to micrometer range and the shaped structure obtained thereby.

28 Claims, 11 Drawing Sheets

OTHER PUBLICATIONS

Sophie Demoustier-Champagne, "Electrochemically Synthesized Polypyrrole Nanotubules: Effects of Different Experimental Conditions", Eur. Polym. J., vol. 34, No. 12, 1998, pp. 1767-1774.

Evan Evans, et al., "Biomembrane Templates for Nanoscale Conduits and Networks", Science, vol. 273, Aug. 16, 1996, pp. 933-935.

Mauricio Terrones, et al., "Nanotubes: A Revolution in Materials Science and Electronics", Fullerenes and Related Structures, 1999, pp. 189-234.

N. Grobert, "Fullerene und Nanoröhrchen: Materialien für das nächste Jahrhundert", Nachr. Chem. Tech. Lab, vol. 47, No. 7, 1999, pp. 768-776.

Darrell H. Reneker, et al., "Nanometre diameter fibres of Polymer, Produced by Electrospinning", Nanotechnology, vol. 7, 1996, pp. 216-223.

* cited by examiner

3 μm 46-1403 Palladium, syn
18-0951 Palladium Hydride
18-1502 Palladium Acetate
22-1583 beta-Poly-p-xylylene

METHOD FOR MAKING SHAPED STRUCTURES WITH INTERNALLY COATED CAVITIES

BACKGROUND OF THE INVENTION

1. Field of the Invention

The present invention relates to a method for making shaped structures with internally coated cavities with an inside diameter in the nanometer to micrometer range and shaped structures made thereby.

2. Discussion of the Background

Tubes having an internal diameter of less than 0.1 mm are referred to as hollow fibers, mesotubes, or nanotubes. These hollow fibers with small inside diameters have been used for separation (e.g., medical dialysis), for gas separation, or for osmosis of aqueous systems (e.g., water conditioning). A discussion of the utility of these fibers may be found in Kirk Othmer, Encyclopedia of Chemical Technology, 4th Edition, Vol. 13, pp. 312–313. The fiber material is usually a porous or nonporous polymer, which act as a semipermeable membrane. In addition, the hollow fibers used for separation purposes typically have a surface area of 100 $cm^2$ per $cm^3$ of volume and an inside diameter of 75 μm to 1 mm.

Hollow fibers are also used in microelectronics. For this purpose, superconducting fibers are used, which have a diameter of about 60 μm are made from superconducting materials by filling polymeric hollow fibers with a compound that acquires superconducting properties after thermal decomposition of the polymer (J. C. W. Chien, H. Ringsdorf et al., Adv. Mater., 2 (1990), p. 305).

Extrusion-spinning methods are usually employed to obtain hollow fibers with an inside diameter of approximately 2 μm; several such extrusion-spinning methods are described in Kirk Othmer, Encyclopedia of Chemical Technology, 4th Edition, Vol. 13, pp. 317–322. However, extrusion-spinning methods are limited in that they are unable to provide hollow fibers with an inside diameter of less than 2 μm.

Very thin fibers can be made by electrostatic spinning techniques; however, this technique is limited in that the resultant fibers do not have cavities. In this case, polymer melts or polymer solutions are extruded in an electric field through cannulas at low pressure. The principles of this technique can be found in European Patent 0005035, European Patent 0095940, U.S. Pat. No. 5,024,789 or International Patent WO 91/01695. Although the electrostatic spinning technique can produce massive fibers with diameters of 10 to 3000 nm, hollow fibers cannot be produced with this technique.

Heretofore, hollow fibers with a very small inside diameter have been obtained only through electrochemical synthesis, such as described in L. A. Chemozantonskii (Chem. Phys. Lett. 297, 257 (1998)), by the methods of supramolecular chemistry (S. Demoustier-Champagne et al., Europ. Polymer J. 34, 1767 (1998)), or with self-organizing membranes as templates (E. Evans et al., Science, Vol. 273, 1996, pp. 933–995). Also, carbon hollow fibers based on fullerene chemistry (carbon nanotubes) with single-walled and multi-walled structures of an individually coiled graphite layer (layer of carbon hexagons condensed with one another on all sides) or concentrically disposed graphite cylinders are described in "Fullerenes and related structures," Editor A. Hirsch, Springer Verlag 1999, pp. 189–234, or N. Grobert, Nachr. Chem. Tech. Lab., 47 (1999), 768–776.

However, these methods are severely limited, as they are only applicable to special materials and cannot be used for making hollow fibers that are mechanically or chemically stable.

For many applications, as in the separation of gases, it is useful to use hollow fibers with small outside and/or inside diameters, made from various materials suitable for the respective application. In particular, it is especially desired that the materials be resistant to thermal, mechanical, and chemical stresses. In certain cases the hollow fiber material must have a porous structure. In addition, they may be selected from electrical conductors or insulators and can contain polymers, inorganic substances or metals. German Patent 1023456.9 provides a suitable hollow fiber with an inside diameter of 10 nm to 50 μm, obtained from technically usable materials such as polymers, inorganic substances or even metals, together with a method for production thereof. The hollow fibers described in German Patent 1023456.9 preferably have inside diameters of 50 nm to 20 μm, more preferably 100 m to 5 μm, even more preferably 100 nm to 2 μm, or 100 run to 1 μm, 500 nm to 1 μm, 10 nm to 1 μm or 100 nm to 500 nm.

The length of the hollow fibers is dictated by the intended use and usually ranges from 50 μm up to several mm or cm. The wall thickness, or in other words the thickness of the outer walls of the hollow fibers, is variable, and usually ranges from 10 to 5000 nm, preferably 10 to 1000 nm, particularly preferably 10 to 250 nm.

In addition to the very small inside diameters, hollow fibers according to German Patent 1023456.9 exhibit a series of characteristics that make them suitable for use in the fields of medicine, electronics, catalysis, chemical analysis, gas separation, osmosis or optics. For example, the outer walls of the hollow fibers can be composed of diverse materials, such as polymers, metals or metal-containing inorganic compounds. The outer walls may be coated with these materials. Accordingly, the hollow fibers may e composed completely of these materials or can be provided with a plurality of layers of the same or different materials. Because of the very small inside diameter, the surface-to-volume ratio of the hollow fibers is very large.

The method for making hollow fibers according to German Patent 1023456.9 can be performed by providing a fiber of a first decomposable material with at least one coating of at least one further material and then decomposing the first material, with the proviso that the resulting hollow fiber has an inside diameter of 10 nm to 50 μm. In an alternative version of the method according to German Patent 1023456.9, a fiber of a first, decomposable material is first coated. This fiber can comprise a material that can be decomposed by thermal, chemical, radiochemical, physical, biological, plasma or ultrasonic means or by extraction with a solvent. Subsequently, the electrostatic spinning technique can be used for making these fibers. Details on the electrostatic spinning technique can be found, for example, in D. H. Reneker and I. Chun, Nanotechn. 7, 216 (1996). A schematic diagram of an electrostatic spinning apparatus is illustrated in FIG. 1.

However, according to the teaching of German Patent 1023456.9, it is necessary to build up the individual layers of the hollow fibers in successive process steps in order to obtain multi-layer hollow fibers. This leads to considerable complexity in both apparatus and process engineering. For many applications, such as in catalysis, it would be desirable to use shaped structures with internally coated cavities, especially internally coated hollow fibers that have small outside and/or inside diameters, that are obtained from materials appropriate for the respective intended use, and that can be made inexpensively by simple techniques.

SUMMARY OF THE INVENTION

Accordingly, it is an object of the present invention to provide a simple method for making shaped structures with internally coated cavities, especially internally coated hollow fibers wherein the inside diameter of the cavities or of the hollow fibers is in the nm to μm range.

This object is achieved by a method for making shaped structures with internally coated cavities comprising:
a) mixing a first material in solution with at least one second material, wherein the second material is soluble in solution or is suspended in the first material;
b) forming the resultant mixture into template fibers with a diameter of 10 nm to 50 μm, wherein the template fibers comprise at least one coating of one or more third material and/or the template fibers are embedded in at least one third material;
c) selectively removing the first material; and
d) forming an internal layer of the second material in the cavities of the third material by immobilizing the second material prior to or concomitant with step (c).

Another object of the present invention is to provide a shaped structure with internally coated cavities produced by this method.

A particularly preferred object of the present invention is to provide a shaped structure with a matrix formed from inorganic compounds, metals or polymers and having a plurality of internally coated cavities or channels with an inside diameter ranging from 10 nm to 50 μm.

The above objects highlight certain aspects of the invention. Additional objects, aspects and embodiments of the invention are found in the following detailed description of the invention.

BRIEF DESCRIPTION OF THE FIGURES

A more complete appreciation of the invention and many of the attendant advantages thereof will be readily obtained as the same becomes better understood by reference to the following Figures in conjunction with the detailed description below.

FIG. 13: Scanning electron micrograph of a section of poly(p-xylylene)/silver hollow fibers (Example 7).

FIG. 14: Scanning electron micrograph of a section of poly(p-xylylene)/polylactide-iron(II,II) hollow fibers (Example 8).

DETAILED DESCRIPTION OF THE INVENTION

Figure 1:
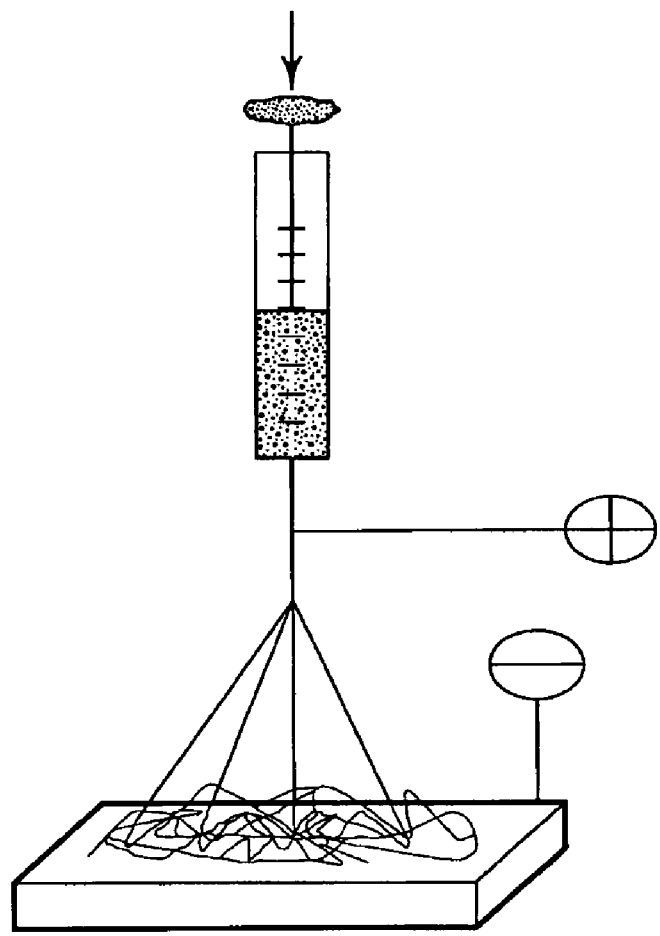
FIG. 1: Schematic diagram of an electrostatic spinning apparatus.

Unless specifically defined, all technical and scientific terms used herein have the same meaning as commonly understood by a skilled artisan in polymers and materials chemistry.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

The present invention is based in part on the Inventor's surprising discovery that internal coatings of cavities in shaped structures, especially hollow fibers having cavities with an inside diameter of the desired dimensions, can be obtained precisely by a simple method. It was particularly surprising that it is no longer necessary to perform coating of the template fibers several times, as the prior art teaches (see German Patent 1023456.9). Instead, shaped structures with internally coated cavities of very small diameter can be obtained by simply mixing a first material, which is removed in order to form the cavities, with a second material, which forms the internal coating.

Furthermore, it was discovered that internal coatings in very small cavities can be obtained from a large number of the diverse materials. Thus shaped structures with a functional internal coating of the cavities can be tailor-made by simple techniques for a large number of the diverse application areas. In particular, it is even possible to use materials that can be processed only with difficulty by standard coating methods, as are described in the prior art for the formation of coated fibers.

A particular advantage of the present inventive method lies in the fact that the quantity of substance for the internal coating can be controlled very simply. Thus the layer thickness and morphology of the internal coating can be adjusted simply. Therefore, the hollow fibers made according to the present invention are different from the hollow fibers with multi-layer structure described in German Patent 1023456.9.

The subject matter of the present invention also includes a shaped structure with internally coated cavities, obtainable by the inventive method.

Furthermore, a critical disadvantage of the multiple coating of template fibers as taught in German Patent 1023456.9 is that the shape of the shaped structure is limited to the shape of the template. Accordingly, the prior art technique is limited to mere reproduction of the shape of the template fibers. Thus, shaped structures of different or more complex shapes with internally coated cavities can not be obtained by this technique.

In another embodiment of the present invention is a shaped structure comprising a matrix formed from inorganic compounds, metals and/or polymers and having a plurality of internally coated cavities and/or channels with inside diameter ranging from 10 nm to 50 μm.

The template fibers comprising the first and second materials can be used—in uncoated form or coated with a third material—to make nanoporous or mesoporous systems, by embedding them in a matrix and then removing or destroying the first material of the template fibers.

In a preferred embodiment of the present invention, an internally coated hollow fiber is obtained with the inventive method.

The invention will therefore be explained hereinafter on the basis of this preferred embodiment. However, the present invention can also be extended analogously to other shaped structures, and especially also to the nanoporous or mesoporous systems described in the foregoing.

The internally coated hollow fibers obtained according to the inventive method preferably have inside diameters of 50 nm to 20 μm, preferably 100 nm to 5 μm, more preferably 100 nm to 2 μm, most preferably 250 to 850 nm, 100 nm to 950 nm, 500 nm to 950 nm, 10 nm to 950 nm, 100 nm to 500 nm, 300 nm to 800 nm, 250 nm to 750 nm, 10 nm to 500 nm, 10 nm to 100 nm, 25 nm to 250 nm, 25 nm to 150 nm, or 50 nm to 100 nm.

The length of the internally coated hollow fibers obtained by the inventive method is dictated by the intended use and usually ranges from 50 μm up to several mm or several cm.

The wall thickness, or in other words the thickness of the outer walls of the internally coated hollow fibers obtained by the inventive method is variable, and usually ranges from 10 to 5000 nm, preferably 10 to 1000 nm, more preferably 10 to 250 nm.

The internal layer of the internally coated hollow fibers obtained by the inventive method can comprise polymers, metals, organic compounds and/or inorganic compounds.

According to the present invention, the internally coated hollow fibers can be obtained by mixing a first material in solution with at least one second material, which is soluble or can be suspended therein, then processing this mixture to a fiber, providing this fiber with at least one coating of at least one third material, and removing the first material in the subsequent step. The hollow fiber obtained in this way has an inside diameter of 10 nm to 50 μm and is coated with an internal layer of the second material and/or of a modification of the second material. The intermixed material (second material) is not removed during removal of the first material, and so the intermixed second material and/or a modification of the second material is deposited as an internal layer.

Figure 2:
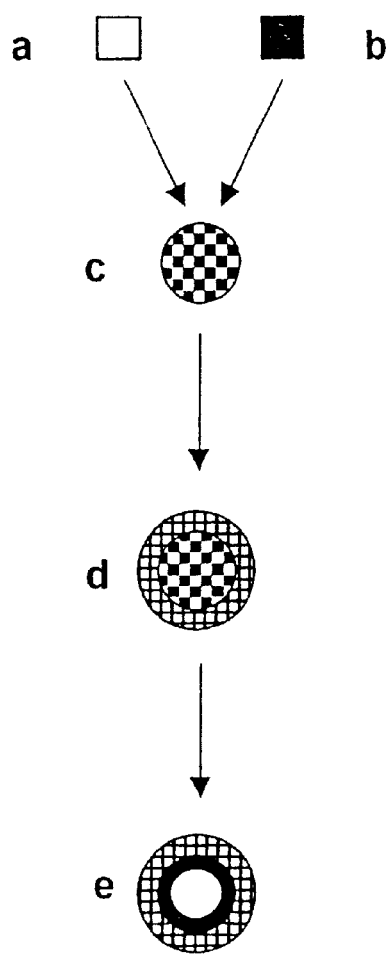
FIG. 2: Schematic diagram of the production of internally coated hollow fibers with a) a first decomposable material, b) a second material, c) cross section of a template fiber of first and second material, d) cross section of a template fiber coated with a third material, e) cross section of an internally coated hollow fiber.

FIG. 2 shows a sketch of a possible embodiment of the method for making the same.

The first material, which is mixed in solution with at least one second soluble or suspendable material, can be a material that can be removed by thermal, chemical, radiochemical, physical, biological, plasma or ultrasonic means or by extraction with a solvent.

The electrostatic spinning technique can be used to make the fibers from the mixture of the first material and the second material. Details on the electrostatic spinning technique can be found, for example, in D. H. Reneker and I. Chun, Nanotechn. 7, 216 (1996). A schematic diagram of an electrostatic spinning apparatus is illustrated in FIG. 1.

In a preferred embodiment, the diameter of the fibers from the mixture of the first and second materials should be on the same order of magnitude as the desired inside diameter of the subsequent hollow fibers.

It is preferred that the cavity of the subsequent hollow fibers be almost equal in size to the diameter of the decomposable fibers or coatings. The exact dimensions depend on the materials used and on the changes thereof during the decomposition process, and can be determined without difficulty by orienting experiments.

As the first material there can be used organic or inorganic materials, especially a polymer such as a polyester, a polyether, a polyolefin, a polycarbonate, a polyurethane, a natural polymer, a polylactide, a polyglycoside, a poly-α-methylstyrene, a polymethacrylate and/or a polyacrylonitrile.

As the soluble or suspendable second material there can be used a polymer such as poly(p-xylylene), polyacrylamide, a polyimide, polyesters, a polyolefin, a polycarbonate, a polyamide, a polyether, polyphenylene, a polysilane, a polysiloxane, a polybenzimidazole, a polybenzothiazole, a polyoxazole, a polysulfide, a polyester amide, a polyarylenevinylene, a polylactide, a polyether ketone, a polyurethane, a polysulfone, an ormocer, a polyacrylate, a silicone, a fully aromatic copolyester, poly-N-vinylpyrrolidone, polyhydroxyethyl methacrylate, polymethyl methacrylate, polyethylene terephthalate, polybutylene terephthalate, polymethacrylonitrile, polyacrylonitrile, polyvinyl acetate, neoprene, buna N, polybutadiene, polytetrafluoroethylene, cellulose (modified or unmodified), an alginate or collagen, or a homopolymer or a copolymer and/or a blend thereof. Furthermore, to produce the mixture with the first decomposable material, a soluble or suspendable second material can be used that is obtained by polymerization, polycondensation or polyaddition of one or more monomer. Examples of suitable monomers for monopolymerization, copolymerization, monopolyaddition, copolyaddition, monopolycondensation or copolycondensation include methacrylate, styrene, styrene sulfonate, 1,6-hexamethylene diisocyanate (HDI), 4,4'-methylenebiscyclohexyl diisocyanate (HDMI), 4,4'-methylenebis(benzyl diisocyanate) (MDI), 1,4-butanediol, ethylenediamine, ethylene, styrene, butadiene, 1-butene, 2-butene, vinyl alcohol, acrylonitrile, methyl methacrylate, vinyl chloride, fluorinated ethylene or a terephthalate.

As the second soluble or suspendable material a metal can also be used, especially a metal from groups Ia, Ib, IIa, IIb, IIIa, IIIb, IVa, IVb, Vb, VIb, VIIb and/or VIIIb of the Periodic Table, in each case as a pure metal or as an alloy. Examples of suitable metals include gold, palladium, aluminum, platinum, silver, titanium, cobalt, ruthenium, rhodium, sodium, potassium, calcium, lithium, vanadium, nickel, tungsten, chromium, manganese and/or silicon. The metals can be used in colloidal form in solution or as a microscale or a nanoscale particle.

Furthermore, the second material can be composed of an inorganic and/or a metalloorganic compound such as palladium(II) acetate, silver acetate, platinum(II) acetylacetonate, palladium(II) acetylacetonate, rhodium(II) acetate, tris(acetylacetonato)rhodium(III), tris(acetylacetonato) ruthenium(III), rhodiumtriphenylphosphine, a metal salt, glass, a glass ceramic, a silicon oxide, perovskite, a ceramic, a platinum oxide, an iron oxide, an aluminum oxide or a zirconium oxide, or alternatively of a silicon carbide, a boron nitride, a carbon oxide or a metal oxide. Suitable compounds are a perovskite of the general formula:

LaXYMgO where X=Ca, Sr, Ba; and
Y=Ga, Al (without stoichiometry), which have oxygen ion conductivity.

Polymeric materials and organic compounds as the second component of the fiber material can also be substituted with functional groups such as an ester, an amide, an amine, a silyl group, a siloxane group, a thiol, a hydroxyl group, a urethane group, a carbamate group, a nitrile group, a C=C— group, a C≡C— group, an acyl halide group, a sulfoxide group, a sulfone group, a pyridyl group, a arylphosphine group or even an ionic group such as a carboxylic acid, a sulfonic acid or a quaternary amine.

The internal layer of the hollow fibers can also be composed of a catalyst, active principles such as an antibiotic or an anesthetic, a protein such as insulin, an antifouling agent, an agrochemical such as a herbicide or a fungicide and/or a biological material such as a carbohydrate, a protein and DNA, by mixing appropriate substances as the second material with the first material in solution.

Insoluble solids as the second material can be used advantageously as a microscale or a nanoscale particle.

Coating with at least one third non-decomposable material can be achieved by gas-phase deposition, plasma polymerization or application of the material in a melt or in a solution. In addition, coating can take place in different layers and with different materials to form the outer wall of the hollow fiber. The coating process, i.e. outer wall formation, may be achieved by gas-phase deposition, doctoring, spin coating, dip coating, spraying or plasma deposition of a polymer. The polymer may be poly(p-xylylene), polyacrylamide, a polyimide, polyesters, a polyolefin, a polycarbonate, a polyamide, a polyether, polyphenylene, a polysilane, a polysiloxane, a polybenzimidazole, a polybenzothiazole, a polyoxazole, a polysulfide, a polyester amide, a polyarylenevinylene, a polylactide, a polyether ketone, a polyurethane, a polysulfone, an ormocer, a polyacrylate, a silicone, a fully aromatic copolyester, poly-N-vinylpyrrolidone, polyhydroxyethyl methacrylate, polymethyl methacrylate, polyethylene terephthalate, polybutylene terephthalate, polymethacrylonitrile, polyacrylonitrile, polyvinyl acetate, neoprene, buna N, polybutadiene, polytetrafluoroethylene, cellulose (modified or unmodified), an alginate or collagen, or a homopolymer or a copolymer and/or a blend thereof.

Furthermore, the decomposable fibers of the first and second material can be coated with a further material, obtained by polymerization, polycondensation or polyaddition of one or more monomer. Examples of suitable monomers for monopolymerization, copolymerization, monopolyaddition, copolyaddition, monopolycondensation or copolycondensation include methacrylate, styrene, styrene sulfonate, 1,6-hexamethylene diisocyanate (HDI), 4,4'-methylenebiscyclohexyl diisocyanate (HDMI), 4,4'-methylenebis(benzyl diisocyanate) (MDI), 1,4-butanediol, ethylenediamine, ethylene, styrene, butadiene, 1-butene, 2-butene, vinyl alcohol, acrylonitrile, methyl methacrylate, vinyl chloride, fluorinated ethylene or a terephthalate.

The coating, or structure of the outer wall of the hollow fibers, can comprise a metal from groups Ia, Ib, IIa, IIb, IIIa, IIIb, IVa, IVb, Vb, VIb, VIIb and/or VIIIb of the Periodic Table, in each case as a pure metal or alloy. Examples of suitable metals include gold, palladium, aluminum, platinum, silver, titanium, cobalt, ruthenium, rhodium, sodium, potassium, calcium, lithium, vanadium, nickel, tungsten, chromium, manganese and/or silicon. Examples of acceptable methods by which the coating can be applied include deposition of metal vapors or by decomposition of suitable metalloorganic compounds using CVD techniques.

Polymeric coating materials can also be substituted with a functional group such as an ester, an amide, an amine, a silyl group, a siloxane group, a thiol, a hydroxyl group, a urethane group, a carbamate group, a nitrile group, a C=C— group, a C≡C— group, an acyl halide group, a sulfoxide group, a sulfone group, a pyridyl group, an arylphosphine group or even an ionic group such as a carboxylic acid, a sulfonic acid or a quaternary amine. The functional group can improve the surface properties of the hollow fibers as regards separation or osmosis methods. The functional group can also be chemically altered subsequently by reactions analogous to those of polymers (e.g., saponification of esters).

The outer wall of the hollow fibers, i.e., the nondecomposable third material, can also be composed of glass, a glass ceramic, a silicon oxide, perovskite, a ceramic, an iron oxide, an aluminum oxide or a zirconium oxide, or alternatively of a silicon carbide, a boron nitride, a carbon oxide or a metal oxide. Once again gas-phase deposition techniques (CVD or PVD) or even hydrothermal techniques are suitable in this regard.

Suitable compounds are perovskites of the general formula

LaXYMgO where X=Ca, Sr, Ba; and
Y=Ga, Al (without stoichiometry), which have oxygen ion conductivity.

The first material can be removed by thermal, chemical, radiation-induced, biological, photochemical, plasma or ultrasonic means, by hydrolysis or by extraction with a solvent. In practice, solvent extraction and thermal decomposition have been effective. Depending on the material, suitable decomposition conditions range from 100 to 500° C. and 0.001 mbar to 1 bar, preferably 0.001 to 0.1 mbar. By virtue of the decomposition or removal of the first material a hollow fiber is obtained having wall material containing the coating materials. It is desired that the second material is appropriately selected or is appropriately treated and, if necessary, reacted in a step prior to removal so that it is not also removed, at least completely, under the conditions used for removal of the first material. Accordingly, in the case of thermal decomposition, the second material must be chosen such that it is at least not substantially decomposed under the conditions of thermal decomposition of the first material.

In an embodiment in which the second material is soluble in the solution of the first material, and in which the first material is removed by solvent extraction, it may be advantageous to transform the second material to an insoluble derivative, by heat treatment, for example, before the solvent extraction. Since a multitude of materials and methods for removal of the first material are available to the person skilled in the art, not all possible material pairs and procedures can be mentioned and discussed here. Nevertheless, individual examples will be described hereinafter. In each case the person skilled in the art will be able, given the information presented here, to find the optimal choice of materials and procedures for the respective practical problem by simple routine experiments.

As shown in FIG. 1b, c and d, a plurality of layers of different materials can also be applied on the fiber. In this way there are obtained hollow fibers which, besides the inner layer, have different outer walls. Alternatively, the outer walls of the hollow fibers can be formed from a plurality of layers. The different layers can perform different functions; for example, the inner layer can have a catalytic function, the middle layer can have special separation properties, such as for gas separation, and the outer layer can have high mechanical stability.

Preferred examples of the hollow fibers obtained by the inventive process can have the following sequences of layers:

Inner layer//glass/metal
Inner layer//metal/glass
Inner layer//glass/polymer
Inner layer//polymer/glass
Inner layer//polymer/polymer
Inner layer//metal/metal
Inner layer//inorganic compound/inorganic compound
Inner layer//ceramic/ceramic
Inner layer//polymer/metal
metal/polymer
Inner layer//ceramic/polymer
Inner layer//polymer/ceramic
Inner layer//metal/ceramic
Inner layer//ceramic/metal
Inner layer//polymer/metal/polymer
Inner layer//metal/polymer/metal
Inner layer//metal/ceramic/metal
Inner layer//polymer/ceramic/polymer
Inner layer//ceramic/polymer/ceramic
Inner layer//polymer/glass/polymer
Inner layer//glass/polymer/glass The internally coated hollow fibers obtained by the inventive method can be used as a separation or storage medium for gases, liquids or particle suspensions and for filtration or purification of mixtures of substances. For example, they can be used as membranes for gases, especially $H_2$, or for liquids, for particle filtration, in chromatography, for oil/water separation, as ion exchangers in dialysis, for separation of cells, bacteria or viruses by size, as components of an artificial lung, for desalination or for extraction or introduction of water, or as filters for dehydration of fuels.

Furthermore, the internally coated hollow fibers obtained by the inventive method can be used in sensor systems for solvents, gases or moisture or in biosensors, in capillary electrophoresis, in catalytic systems, as controlled-release or drug-delivery systems, in medical separation techniques, in dialysis, as artificial lungs, as protein stores or in tissue engineering.

In the clothing/textile industry, the internally coated hollow fibers obtained by the inventive method can be used in photochromic or thermochromatic garments by embedding dyes as the inner layer or for the purpose of identification by markers in the internal layer of the tubes.

Moreover, the internally coated hollow fibers obtained by the inventive method may be used in electronics, in optics, for example as anisotropic optical elements, in display technology, for example as components of field-emission electrodes, or in energy production. Further uses of the internally coated hollow fibers obtained by the inventive method include microreactors, for example for catalytic reactions and template reactions, and bioreactors, for heat generation by conversion of sunlight (solar alpha systems), in chip technology as flexible devices, or in microscopy as sensor components (for example as tips or probes for scanning probe microscopes or SNOM instruments).

Because of the large surface of the internally coated hollow fibers obtained by the inventive method, these fibers can also be used in fuel cells and batteries or for electrochemical reactions. Advantageously the outer wall of the internally coated hollow fibers for such uses contains oxygen ion conductors such as a perovskite. For oxidation reactions, a stream of starting material (such as an olefin) can be circulated around the hollow fibers, while oxygen is passed through the cavities of the fibers. The oxidation product is formed on the outside of the hollow fibers and removed.

The internally coated hollow fibers obtained by the inventive method can be used as a catalytic system, since the inventive method makes it possible, for example, to obtain inner coatings of finely divided particles. As an example, internally coated hollow fibers having an internal layer of finely divided platinum or palladium particles can be used as nitrogen oxide catalytic converters in motor vehicles.

Having generally described this invention, a further understanding can be obtained by reference to certain specific examples, which are provided herein for purposes of illustration only, and are not intended to be limiting unless otherwise specified.

EXAMPLES

Example 1

Production of poly(p-xylylene) Hollow Fibers Coated Internally with Platinum by Intermixing Metal Powder into the Template Fibers A sufficient quantity of polylactide (poly-L-lactide) and platinum powder (particle size 0.27 to 0.47 µm) were mixed in dichloromethane at a ratio of $R=(W_{Pt}/W_{poly-L-lactide}+W_{pt})$ =0.3 to obtain a 5% suspension. Poly-L-lactide-platinum template fibers were obtained by electrostatic spinning this 5% suspension in the apparatus illustrated in FIG. 1. An aluminum frame was used as the substrate and a capillary having a 0.3 mm diameter was also used. The electrode spacing was 20 cm and the voltage was 47 kV.

Using paracyclophane (450 mg) as starting material, the resulting poly-L-lactide-platinum template fibers were coated with poly(p-xylylene). The deposition chamber had a diameter of 6 cm and a length of 12 cm, the furnace temperature for pyrolysis of paracyclophane was 400 to 750° C., and the vacuum was adjusted to 0.1 mbar.

The resulting poly-L-lactide-platinum/poly(p-xylylene) composite fibers were transformed to poly(p-xylylene)/platinum hollow fibers by heating at 240° C. for 12 h at 0.04 mbar.

Figure 3:
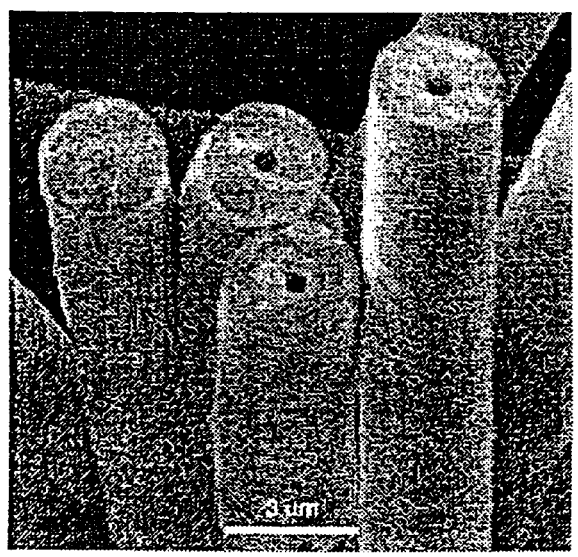
FIG. 3: Scanning electron micrograph of a section of poly(p-xylylene)/platinum hollow fibers (Example 1).

Scanning electron microscopy analysis showed that hollow fibers were obtained (FIG. 3).

Example 2

Production of poly(p-xylylene) Hollow Fibers Coated Internally with Platinum by Intermixing Metal Compounds into the Template Fibers A sufficient quantity of poly-L-lactide and platinum acetylacetonate were mixed in dichloromethane at a ratio of R=0.50 to obtain a 5% solution. Using this solution, composite template fibers were obtained by electrostatic spinning in the apparatus illustrated in FIG. 1 and described in Example 1.

The resulting two-component template fibers were then coated with poly(p-xylylene) as described in Example 1.

Subsequently, the resulting poly-L-lactide-Pt $(CH_3COCH=C(O)CH_3)_2$/poly(pxylylene) composite fibers were transformed to poly(p-xylylene)/platinum hollow fibers by heating at 240° C. for 12 h at 0.04 mbar. During the heat treatment, platinum acetylacetonate was transformed to elemental platinum. Elemental analysis yielded the following values: Pt 2.90%, C 90.01%, H 6.84%.

Figure 4:
FIG. 4: Scanning electron micrograph of a section of poly(p-xylylene)/platinum hollow fibers (Example 2).

Scanning electron microscopy analysis showed that hollow fibers were obtained (FIG. 4).

Example 3

Production of poly(p-xylylene) Hollow Fibers Coated Internally with Platinum Dioxide by Intermixing Metal Compounds into the Template Fibers A sufficient quantity of poly-L-lactide and platinum dioxide powder (particle size 0.27 to 0.47 µm) were mixed in dichloromethane at a ratio of R=0.32 to obtain a 5% solution. Using this solution, composite template fibers were obtained by electrostatic spinning in the apparatus illustrated in FIG. 1 and as described in Example 1.

The resulting two-component template fibers were then coated with poly(p-xylylene) as described in Example 1.

Subsequently, the resulting poly-L-lactide-$PtO_2$/poly(p-xylylene) composite fibers were transformed to poly(p-xylylene)/$PtO_2$ hollow fibers by heating at 240° C. for 12 h at 0.04 mbar.

Figure 5:
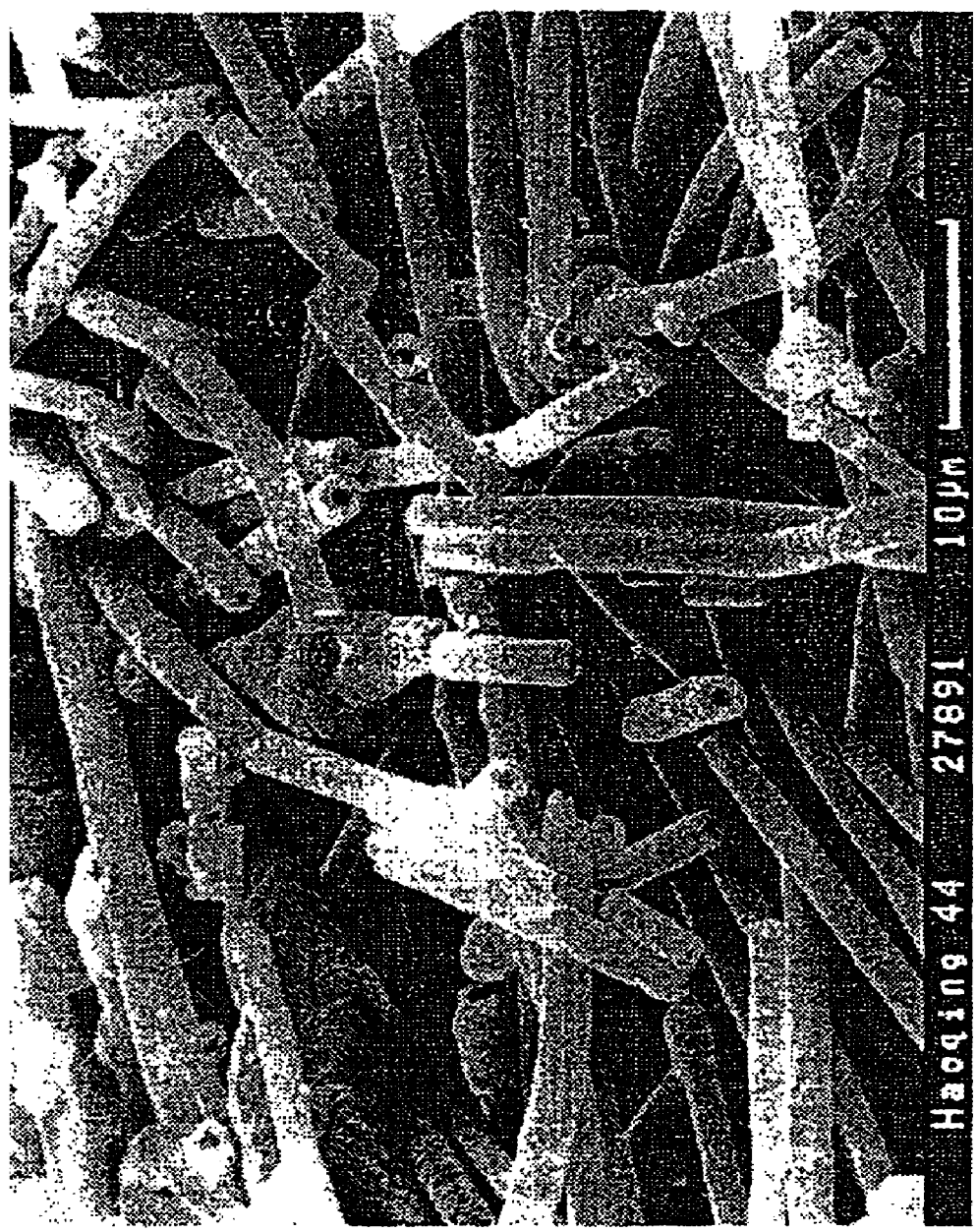
FIG. 5: Scanning electron micrograph of a section of poly(p-xylylene)/$PtO_2$ hollow fibers (Example 3).

Scanning electron microscopy analysis showed that hollow fibers were obtained (FIG. 5).

Example 4

Production of poly(p-xylylene) Hollow Fibers Coated Internally with Palladium by Intermixing Metal Compounds into the Template Fibers A sufficient quantity of polyethylene oxide (PEO) and palladium acetate were mixed in ethanol at a ratio of R=0.50 to obtain a 2.5% solution. Using this solution, template fibers were obtained by electrostatic spinning in the apparatus illustrated in FIG. 1 and as described in Example 1.

The resulting PEO-Pd(OAc)$_2$ template fibers were then coated with poly(p-xylylene) as described in Example 1. However, the starting material, paracyclophane, was used in a quantity of 480 mg.

Subsequently, the resulting PEO-Pd(OAc)$_2$/poly(p-xylylene) composite fibers were heat-treated at 200° C. for 12 h at 30 mbar. PEO was then removed by extraction with chloroform (12 h) and the composite fibers were transformed to poly(p-xylylene)/palladium hollow fibers.

Figure 6:
FIG. 6: Scanning electron micrograph of a section of poly(p-xylylene)/palladium hollow fibers (Example 4).

Scanning electron microscopy analysis showed that hollow fibers were obtained (FIG. 6).

Example 5

Production of poly(p-xylylene) Hollow Fibers Coated Internally with Palladium by Intermixing Metal Compounds into the Template Fibers A sufficient quantity of poly-L-lactide and palladium acetate were mixed in dichloromethane at a ratio of R=0.83 to obtain a 5% solution. Using this solution, template fibers were obtained by electrostatic spinning in the apparatus illustrated in FIG. 1 and as described in Example 1.

The resulting two-component template fibers were then coated with poly(p-xylylene) as described in Example 1.

Figure 7:
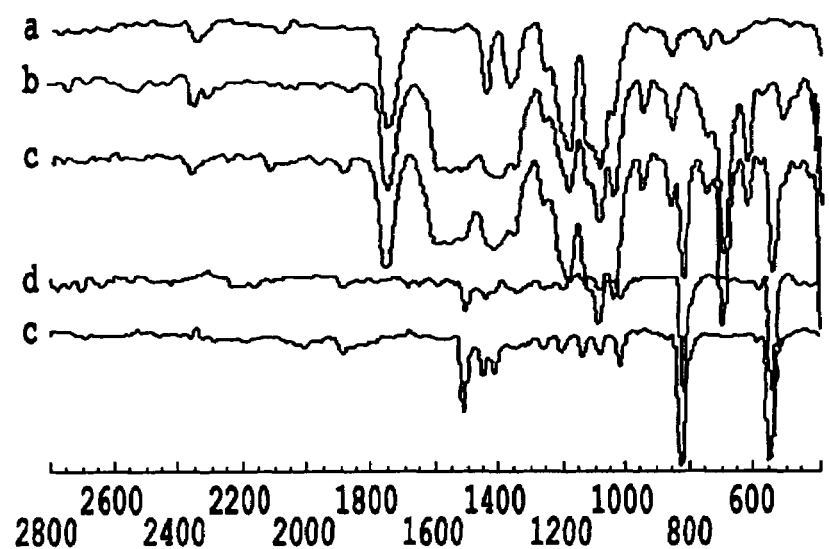
FIG. 7: IR spectra of a) poly-L-lactide (PLA) fibers, b) poly-L-lactide-palladium acetate fibers (PLA/Pd(OAc)$_2$ fibers), c) poly-L-lactide-palladium acetate/poly(p-xylylene) fibers (PLA/Pd(OAc)$_2$/PPX fibers) as well as d) poly(p-xylylene)/palladium hollow fibers (PPX/Pd hollow fibers) and e) poly(p-xylylene) hollow fibers. The PPX/ palladium hollow fibers (d) were obtained from the PLA/Pd(OAc)$_2$/PPX fibers (c) (Example 5).

Subsequently, the resulting poly-L-lactide-Pd(OAc)$_2$/poly(p-xylylene) composite fibers were heat-treated at 240° C. for 12 h at 0.04 mbar and transformed to poly(pxylylene)/palladium hollow fibers. The decomposition of poly-L-lactide was demonstrated by IR spectrometry (FIG. 7).

Figure 8:
FIG. 8: Scanning electron micrograph of a section of poly(p-xylylene)/palladium hollow fibers (Example 5).

Scanning electron microscopy analysis showed that hollow fibers were obtained (FIG. 8). Elemental analysis yielded Pd 81.30%, C 12.6% and H 1.96%. Furthermore, the presence of palladium was detected by element-specific X-ray scattering.

Example 6

Figure 9:
FIG. 9: Scanning electron micrograph of poly-L-lactide-palladium acetate template fibers (obtained by electrostatic spinning from a dichloromethane solution containing 3 wt % poly-L-lactide and 18 wt % Pd(OAc)$_2$) (Example 6).

Production of poly(p-xylylene) Hollow Fibers Coated Internally with Substoichiometric Palladium Hydride by Intermixing Metal Compounds into the Template Fibers Poly-L-lactide (3 wt %) and palladium acetate (18 wt %) were mixed in dichloromethane. Using this solution, template fibers (FIG. 9) were obtained by electrostatic spinning in the apparatus illustrated in FIG. 1 and as described in Example 1.

The resulting two-component template fibers were then coated with poly(p-xylylene) as described in Example 1. However, the starting material, paracyclophane, was used in a quantity of 400 mg and the furnace temperature for pyrolysis of paracyclophane was 400 to 800° C.

Subsequently, the resulting poly-L-lactide-Pd(OAc)$_2$/poly(p-xylylene) composite fibers were heat-treated at 240° C. for 12 h at 0.04 mbar and transformed to poly(p-xylylene)/PdH$_x$ hollow fibers with x<1.

Figure 10:
FIG. 10: Scanning electron micrograph of a section of poly(p-xylylene)/PdH$_{x<1}$ hollow fibers (Example 6).

Scanning electron microscopy analysis showed that hollow fibers were obtained (FIG. 10). Elemental analysis yielded Pd 38.80%, C 55.40% and H 4.60%.

Figure 11:
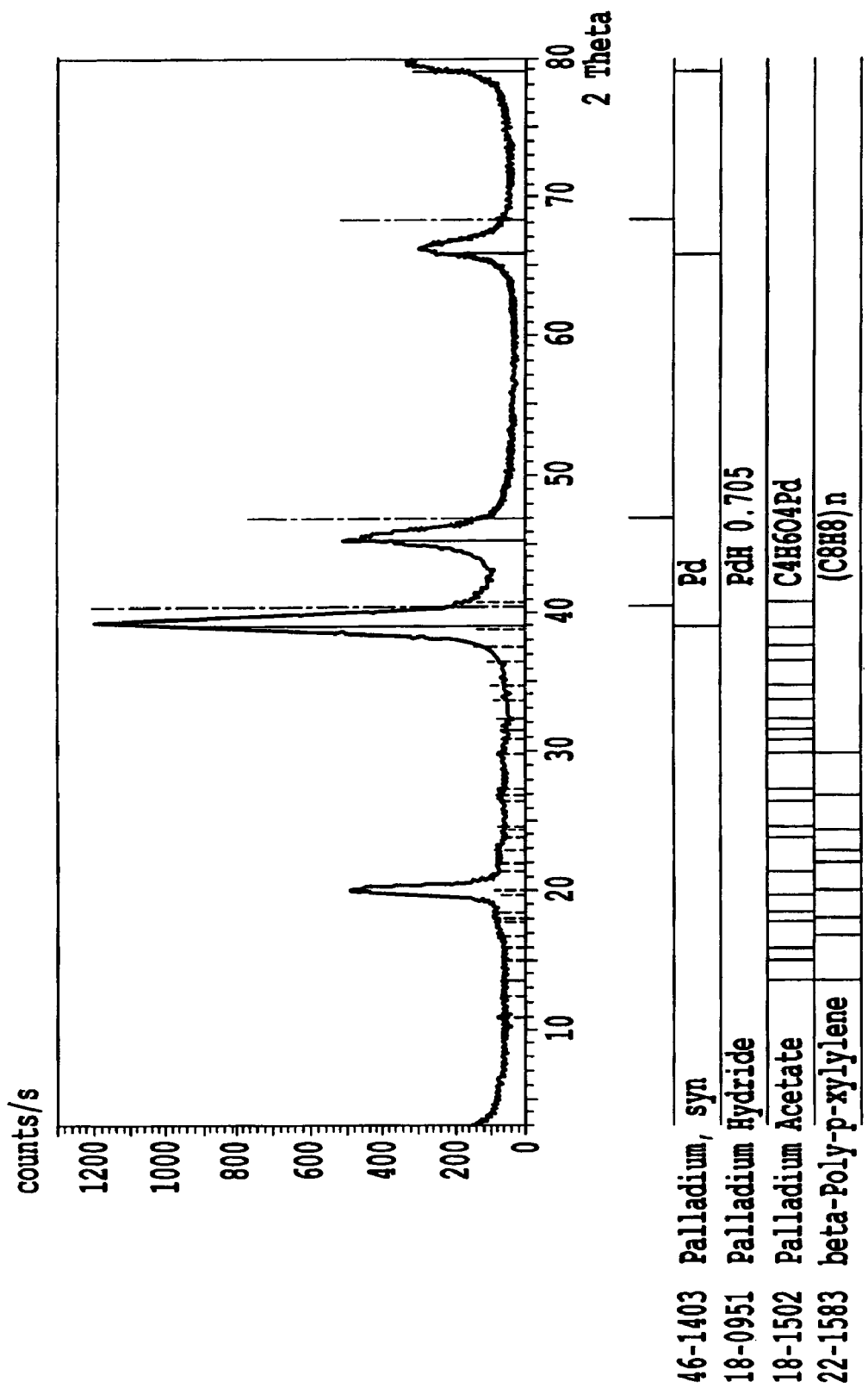
FIG. 11: X-ray diffraction diagram of poly(p-xylylene)/PdH$_{x<1}$ hollow fibers (Example 6).

In an XRD study (specimen prepared on an Si single-crystal holder and measured in an X-ray diffractometer in an angular range of $3° \leq 2\theta_q \geq 80°$), it was demonstrated that palladium acetate was absent and proved that a substoichiometric Pd/H species was present as the internal coating (FIG. 11). The intensity ratios of the PPX layers suggest texture influences due to stretching.

Example 7

Figure 12:
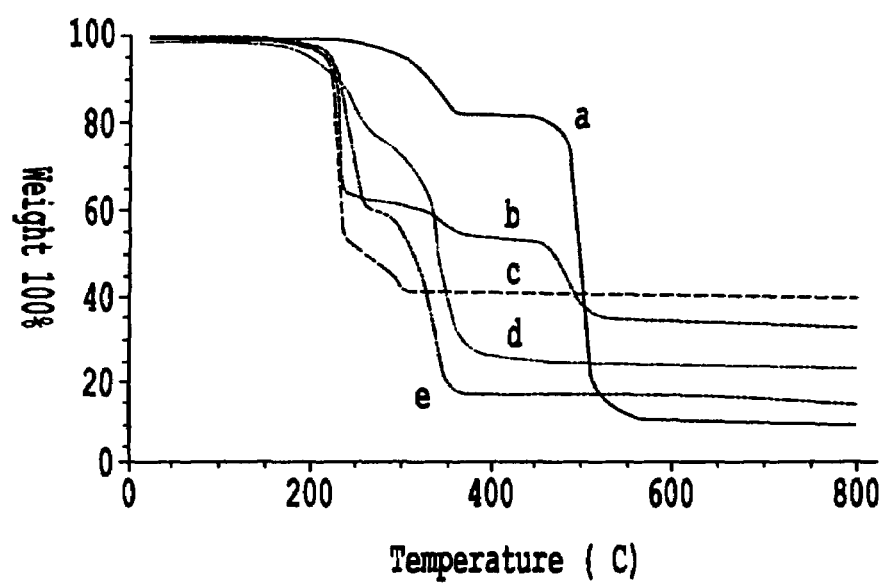
FIG. 12: Thermogravimetric analysis (TGA) (Mettler TG, heating rate: 10 C/min, $N_2$) of template fibers and fibers coated with poly(p-xylylene): a) poly-L-lactide/poly(p-xylylene) fibers (PLA/PPX fibers), b) poly-L-lactide-palladium acetate/poly(p-xylylene) fibers (PLA/Pd(OAc)$_2$/PPX fibers), c) poly-L-lactide-palladium acetate fibers (PLA/Pd(OAc)$_2$ fibers), poly-L-lactide-silver acetate fibers (PLA/AgOAc$_2$ fibers), poly-L-lactide-platinum acetylacetonate fibers (PLA-Pt(CH$_3$COCH=C(O)CH$_3$)$_2$ fibers) (Example 7).

Production of poly(p-xylylene) Hollow Fibers Coated Internally with Silver by Intermixing Metal Compounds into the Template Fibers A sufficient quantity of poly-L-lactide and silver acetate were mixed in dichloromethane at a ratio of R=0.53 in dichloromethane to obtain a 4% solution. Using this solution, template fibers were obtained by electrostatic spinning in the apparatus illustrated in FIG. 1 and as described in Example 1. FIG. 12 shows the result of thermogravimetric analysis of the polylactide-silver acetate template fibers (PLA-AgOAc fibers).

The resulting two-component template fibers were then coated with poly(p-xylylene) as described in Example 1. However, the starting material, paracyclophane, was used in a quantitiy of 460 mg.

Subsequently, the resulting poly-L-lactide-Ag(OAc)$_2$/poly(p-xylylene) composite fibers were heated at a heating rate of 8° C. per minute from 25° C. to 335° C. in a nitrogen atmosphere and maintained for 5 minutes at 335° C., thus transforming them to poly(pxylylene)/silver hollow fibers.

Scanning electron microscopy analysis showed that hollow fibers were obtained (FIG. 13).

Example 8

Production of poly(p-xylylene) Hollow Fibers Coated Internally with Iron(II,II) Oxide by Intermixing Metal Oxide into the Template Fibers A sufficient quantity of poly-L-lactide and iron(II,II) oxide $Fe_3O_4$ were mixed in dichloromethane at a ratio of R=0.40 to obtain a 5% solution. Using this solution, template fibers were obtained by electrostatic spinning in the apparatus illustrated in FIG. 1 and described in Example 1.

The resulting polylactide-iron(II,II) oxide template fibers were then coated with poly(p-xylylene) as described in Example 1. However, the starting material, paracyclophane, was used in a quantity of 360 mg.

Subsequently, the resulting poly-L-lactide-polylactide-iron(II,II) oxide/poly(pxylylene) composite fibers were heat-treated at 240° C. for 12 h at 0.04 mbar and transformed to poly(p-xylylene)/polylactide-iron(II,II) oxide hollow fibers.

Scanning electron microscopy analysis showed that hollow fibers were obtained (FIG. 14).

Numerous modifications and variations on the present invention are possible in light of the above teachings. It is, therefore, to be understood that within the scope of the accompanying claims, the invention may be practiced otherwise than as specifically described herein.

The present application claims priority to German Application No. DE 101 16 232.4, filed on Apr. 2, 2001, which is hereby incorporated by reference in its entirety.

We claim:

1. A method for making a shaped structure with internally coated cavities, comprising:
   a) mixing a first material in solution with at least one second material, wherein the second material is soluble in solution or is suspended in the first material;
   b) forming the resultant mixture into template fibers with a diameter of 10 nm to 50 μm, wherein the template fibers comprise at least one coating of one or more third materials or the template fibers are embedded in at least one third material;
   c) selectively removing the first material; and
   d) forming an internal layer of the second material in the cavities of the third material by immobilizing the second material prior to or concomitant with step (c); wherein said shaped structure comprises a matrix comprising a member selected from the group consisting of inorganic compounds, metals, polymers and mixtures thereof.

2. The method according to claim 1, wherein said forming comprises electrostatic spinning.

3. The method according to claim 1, wherein the first material comprises one or more organic materials or inorganic materials.

4. The method according to claim 3, wherein the first material comprises one or more polymers selected from the group consisting of a polyester, a polyether, a polyolefin, a polycarbonate, a polyurethane, a natural polymer, a polylactide, a polyglycoside, a poly-α-methylstyrene, a polymethacrylate, and a polyacrylonitrile.

5. The method according to claim 1, wherein said selectively removing the first material comprises a thermal means, a chemical means, a biological means, a radiation-induced means, a photochemical means, a plasma means, an ultrasonic means, or solvent extraction.

6. The method according to claim 1, wherein the shaped structure is a hollow fiber having template fibers comprising at least one coating of at least one third material.

7. The method according to claim 6, wherein the hollow fiber has an inside diameter of 10 nm to 50 μm.

8. The method according to claim 6, wherein the hollow fiber has an inside diameter of 10 nm to 1 μm.

9. The method according to claim 1, wherein the diameter of the template fibers is from 10 nm to 1 μm.

10. The method according to claim 1, wherein the second material comprises an inorganic compound, an organic compound, a polymer, a metal, or combinations thereof.

11. The method according to claim 1, wherein the second material comprises a compound selected from the group consisting of poly(p-xylylene), polyacrylamide, a polyimide, a polyester, a polyolefin, a polycarbonate, a polyamide, a polyether, polyphenylene, a polysilane, a polysiloxane, a polybenzimidazole, a polybenzothiazole, a polyoxazole, a polysulfide, a polyester amide, a polyarylenevinylene, a polylactide, a polyether ketone, a polyurethane, a polysulfone, an ormocer, a polyacrylate, a silicone, a fully aromatic copolyester, poly-N-vinylpyrrolidone, polyhydroxyethyl methacrylate, polymethyl methacrylate, polyethylene terephthalate, polybutylene terephthalate, polymethacrylonitrile, polyacrylonitrile, polyvinyl acetate, neoprene, buna N, polybutadiene, polytetrafluoroethylene, modified cellulose, unmodified cellulose, an alginate, collagen, a copolymer thereof, and a blend thereof.

12. The method according to claim 1, wherein the second material comprises at least one metal selected from the group consisting of Group Ia, Group Ib, Group IIa, Group IIb, Group IIIa, Group IIIb, Group IVa, Group IVb, Group Vb, Group VIb, Group VIIb and Group IIIb, of the Periodic Table.

13. The method according to claim 12, wherein the metal is a pure metal or a metal alloy.

14. The method according to claim 1, wherein the second material comprises one or more compounds selected from the group consisting of a metal salt, a metal oxide, glass, a glass ceramic, a silicon oxide, a perovskite, a ceramic, an aluminum oxide, an iron oxide, a silicon carbide, a boron nitride, a carbon oxide and a zirconium oxide.

15. The method according to claim 1, wherein the second material comprises a metalloorganic compound.

16. The method according to claim 1, wherein the second material comprises one or more compounds selected from the group consisting of palladium(II) acetate, silver acetate, platinum(II) acetylacetonate, palladium(II) acetylacetonate, rhodium(II) acetate, tris(acetylacetonato)rhodium(III), tris(acetylacetonato)ruthenium(III), and rhodiumtriphenylphosphine.

17. The method according to claim 1, wherein the second material comprises a catalyst.

18. The method according to claim 1, wherein the second material comprises one or more compounds selected from the group consisting of an active principle, an agrochemical, and a biological material.

19. The method according to claim 1, wherein the second material is produced by a process selected from the group consisting of polymerization, polycondensation, polyaddition, homopolymerization, copolymerization, homopolyaddition, copolyaddition, homopolycondensation, and copolycondensation of one or more monomer subunits.

20. The method according to claim 19, wherein the monomer subunit is one or more compounds selected from the group consisting of methacrylate, styrene, styrene sulfonate, 1,6-hexamethylene diisocyanate (HDI), 4,4'-methylenebiscyclohexyl diisocyanate (HDMI), 4,4'-methylenebis(benzyl diisocyanate) (MDI), 1,4-butanediol, ethylenediamine, ethylene, styrene, butadiene, 1-butene, 2-butene, vinyl alcohol, acrylonitrile, methyl methacrylate, vinyl chloride, fluorinated ethylene, and terephthalate.

21. The method according to claim 1, wherein the third material comprises one or more compounds selected from the group consisting of an inorganic compound, a polymer, and a metal.

22. The method according to claim 1, wherein the third material comprises a compound selected from the group consisting of poly(p-xylylene), polyacrylamide, a polyimide, a polyester, a polyolefin, a polycarbonate, a polyamide, a polyether, polyphenylene, a polysilane, a polysiloxane, a polybenzimidazole, a polybenzothiazole, a polyoxazole, a polysulfide, a polyester amide, a polyarylenevinylene, a polylactide, a polyether ketone, a polyurethane, a polysulfone, an ormocer, a polyacrylate, a silicone, a fully aromatic copolyester, poly-N-vinylpyrrolidone, polyhydroxyethyl methacrylate, polymethyl methacrylate, polyethylene terephthalate, polybutylene terephthalate, polymethacrylonitrile, polyacrylonitrile, polyvinyl acetate, neoprene, buna N, polybutadiene, polytetrafluoroethylene, modified cellulose, unmodified cellulose, an alginate, collagen, a copolymer thereof, and a blend thereof.

23. The method according to claim 1, wherein the third material comprises at least one metal selected from the group consisting of Group Ia, Group Ib, Group IIa, Group IIb, Group IIIa, Group IIIb, Group IVa, Group IVb, Group Vb, Group VIb, Group VIIb and Group IIIb, of the Periodic Table.

24. The method according to claim 23, wherein the metal is a pure metal or a metal alloy.

25. The method according to claim 1, wherein the third material comprises one or more compounds selected from the group consisting of a metal salt, a metal oxide, glass, a glass ceramic, a silicon oxide, a perovskite, a ceramic, an aluminum oxide, an iron oxide, a silicon carbide, a boron nitride, a carbon oxide and a zirconium oxide.

26. The method according to claim 1, wherein the second material is produced by a process selected from the group consisting of polymerization, polycondensation, polyaddition, homopolymerization, copolymerization, homopolyaddition, copolyaddition, homopolycondensation, and copolycondensation of one or more monomer subunits.

27. The method according to claim 26, wherein the monomer subunit is one or more compounds selected from the group consisting of methacrylate, styrene, styrene sulfonate, 1,6-hexamethylene diisocyanate (HDI), 4,4'-methylenebiscyclohexyl diisocyanate (HDMI), 4,4'-methylenebis(benzyl diisocyanate) (MDI), 1,4-butanediol, ethylenediamine, ethylene, styrene, butadiene, 1-butene, 2-butene, vinyl alcohol, acrylonitrile, methyl methacrylate, vinyl chloride, fluorinated ethylene, and terephthalate.

28. A shaped structure, comprising:
a matrix comprising a member selected from the group consisting of inorganic compounds, metals, polymers and mixtures thereof;
said shaped structure further comprising a plurality of internally coated cavities or channels with an inside diameter of from 10 nm to 50 µm;
wherein said shaped structure is produced by a method, comprising:
a) mixing a first material in solution with at least one second material, wherein the second material is soluble in solution or is suspended in the first material;
b) forming the resultant mixture into template fibers with a diameter of 10 nm to 50 µm, wherein the template fibers comprise at least one coating of one or more third materials or the template fibers are embedded in at least one third material;
c) selectively removing the first material; and
d) forming an internal layer of the second material in the cavities of the third material by immobilizing the second material prior to or concomitant with step (c).

* * * * *